(12) United States Patent
Bikson et al.

(10) Patent No.: US 6,755,894 B2
(45) Date of Patent: Jun. 29, 2004

(54) HOLLOW FIBER MEMBRANE GAS SEPARATION CARTRIDGE AND GAS PURIFICATION ASSEMBLY

(75) Inventors: Benjamin Bikson, Brookline, MA (US); Scott Andrew Bartholomew, Worcester, MA (US); Salvatore Giglia, Norwood, MA (US); Bradley Quinn Johnson, Lakeville, MA (US)

(73) Assignee: Praxair Technology, Inc., Danbury, CT (US)

( * ) Notice: Subject to any disclaimer, the term of this patent is extended or adjusted under 35 U.S.C. 154(b) by 0 days.

(21) Appl. No.: 10/153,912

(22) Filed: May 24, 2002

(65) Prior Publication Data

US 2002/0162455 A1 Nov. 7, 2002

Related U.S. Application Data

(63) Continuation-in-part of application No. 09/846,233, filed on May 2, 2001.

(51) Int. Cl.$^7$ .......................... B01D 53/22; B01D 53/26; B01D 63/02
(52) U.S. Cl. .................. 95/52; 96/8; 96/10; 210/321.8
(58) Field of Search ............................... 95/45, 51, 52, 95/54, 55; 96/8–10, 4; 210/321.8, 321.89, 321.81, 321.9

(56) References Cited

U.S. PATENT DOCUMENTS

| | | | |
|---|---|---|---|
| 3,499,062 A | 3/1970 | Geary, Jr et al. ............. 264/36 |
| 3,616,929 A | * 11/1971 | Manjikian ................. 210/321.9 |
| 3,722,694 A | 3/1973 | Agranat .................. 210/321.89 |
| 3,735,558 A | 5/1973 | Skarstrom et al. ............. 55/16 |
| 3,981,696 A | 9/1976 | Lalis et al. ....................... 96/8 |
| 4,002,567 A | * 1/1977 | Konno et al. .......... 210/333.01 |
| 4,220,535 A | 9/1980 | Leonard .................. 210/321 R |
| 4,451,369 A | 5/1984 | Sekino et al. ............. 210/321.1 |
| 4,547,289 A | 10/1985 | Okano et al. ........ 210/321.89 X |
| 4,622,143 A | 11/1986 | Edwrds .................... 210/321.1 |
| 4,623,460 A | 11/1986 | Kuzumoto et al. ....... 210/310.1 |
| 4,640,773 A | 2/1987 | Nishida et al. ............... 96/8 X |
| 4,670,145 A | 6/1987 | Edwards .................. 210/310.1 |
| 4,676,808 A | 6/1987 | Coplan ......................... 55/158 |
| 4,687,578 A | 8/1987 | Stookey ................... 210/321.1 |
| 4,689,255 A | 8/1987 | Smoot et al. ................. 96/8 X |
| 4,707,267 A | 11/1987 | Johnson ....................... 210/650 |
| 4,718,921 A | 1/1988 | Makino et al. ............... 55/16 |
| 4,781,834 A | 11/1988 | Sekino et al. ........... 210/321.88 |
| 4,832,841 A | 5/1989 | Gutman et al. .......... 210/321.8 |
| 4,865,736 A | 9/1989 | Coplan .................. 210/321.79 |
| 4,871,379 A | 10/1989 | Edwards ....................... 55/158 |
| 4,881,955 A | 11/1989 | Bikson et al. ................. 55/16 |
| 4,929,259 A | 5/1990 | Caskey et al. ................ 55/158 |
| 4,941,897 A | 7/1990 | Vann, III ......................... 96/8 |
| 5,013,437 A | 5/1991 | Trimmer et al. ....... 210/321.78 |

(List continued on next page.)

FOREIGN PATENT DOCUMENTS

| | | | | |
|---|---|---|---|---|
| JP | 06134244 A | 5/1994 | ..................... 96/8 |
| JP | 06134245 A | 5/1994 | ..................... 96/8 |
| JP | 06134246 A | 5/1994 | ..................... 96/8 |
| JP | 06238119 A | 8/1994 | ..................... 96/8 |

Primary Examiner—Robert H. Spitzer
(74) Attorney, Agent, or Firm—David M. Rosenblum (57) ABSTRACT

A hollow fiber membrane gas separation apparatus of a compact design suitable for separation and purification of gases is disclosed. The apparatus comprises an outer housing that consists of a detachable bowl and a head closure, and a removable hollow fiber membrane cartridge positioned therein. The cartridge contains several concentric separation zones and provides for efficient countercurrent flow configuration between the feed gas on the shell side and the permeate sweep gas on the lumen side of the hollow fiber membranes.

37 Claims, 5 Drawing Sheets

U.S. PATENT DOCUMENTS

| | | | |
|---|---|---|---|
| 5,026,479 A | 6/1991 | Bikson et al. | 210/321.8 |
| 5,041,220 A | 8/1991 | Lee et al. | 210/321.8 |
| 5,108,464 A | 4/1992 | Friesen et al. | 55/16 |
| 5,133,858 A | 7/1992 | Walz et al. | 96/8 X |
| 5,137,631 A | 8/1992 | Eckman et al. | 210/321.8 |
| 5,158,581 A | 10/1992 | Coplan | 55/16 |
| 5,160,042 A | 11/1992 | Bikson et al. | 210/321.8 |
| 5,169,530 A | 12/1992 | Schucker et al. | 210/321.81 |
| 5,211,728 A | 5/1993 | Trimmer et al. | 55/16 |
| 5,288,308 A | 2/1994 | Puri et al. | 96/8 |
| 5,352,361 A * | 10/1994 | Prasad et al. | 210/321.81 |
| 5,411,662 A | 5/1995 | Nicolas, Jr. et al. | 210/312.8 |
| 5,470,469 A | 11/1995 | Eckman | 210/321.8 |
| 5,525,143 A | 6/1996 | Morgan et al. | 95/52 |
| 5,554,283 A | 9/1996 | Brinda et al. | 96/8 X |
| 5,695,702 A | 12/1997 | Niermeyer | 96/8 X |
| 5,762,789 A | 6/1998 | De Los Reyes et al. | 210/321.8 X |
| 5,938,922 A * | 8/1999 | Fulk et al. | 210/321.81 |
| 6,153,097 A | 11/2000 | Jensvold et al. | 210/321.81 |
| 6,180,168 B1 | 1/2001 | Stookey et al. | 427/325 |

* cited by examiner

HOLLOW FIBER MEMBRANE GAS SEPARATION CARTRIDGE AND GAS PURIFICATION ASSEMBLY

This is a Continuation-in-Part of prior U.S. application No. 09,846,233 filing date May 2, 2001.

BACKGROUND OF THE INVENTION

1. Field of the Invention

The present invention relates to a gas separation apparatus, more particularly, to a gas separation apparatus using hollow fiber membranes that exhibit selective permeability to gases. The gas separation apparatus of this invention features a compact housing and a removable hollow fiber membrane cartridge positioned therein. The apparatus is particularly useful for dehumidifying compressed air and generating nitrogen enriched air.

2. Description of the Related Art

Fluid separation devices for separating components of a fluid mixture by using hollow fiber membranes having a selective permeability are used in a number of industrial separations including gas separations, dialysis, ultrafiltration, reverse osmosis and the like. The design of the hollow fiber fluid separation devices of these fluid separation applications is taught in U.S. Pat. Nos. 3,722,694; 4,451,369; 4,622,143; 4,623,460; 4,670,145; 4,707,267; 4,781,834; 4,865,736; 4,871,379; 4,881,955; 4,929,259; 5,137,631; 5,211,728; and 5,470,469.

In general, a hollow fiber fluid separation apparatus is comprised of a bundle of hollow fibers constituted within a casing. The bundle is potted with a resinous potting agent at the terminal ends to form tubesheets that provide for a fluid-tight seal between the feed and permeate sides. The resulting bundle is secured removably or permanently in the casing such that the tubesheets divide the casing volume into feed and permeate sections.

The use of various hollow fiber membrane gas separation devices for separating gas mixtures, such as separation of oxygen from nitrogen, recovery of hydrogen from hydrogen-containing gas streams, natural gas sweetening and dehumidification of compressed air is well known in the art. Normally, these separation devices are designed so that the gas mixture can be brought into contact with the hollow fiber membrane therein under a partial pressure differential one or more highly permeable components of the fluid mixture are separated from the less permeable components by permeation through the membrane. The hollow fiber membranes allow the more readily permeable component of the fluid mixture to permeate into the permeate side of the hollow fiber membrane while retaining a substantial portion of the less readily permeable component of the fluid mixture on the nonpermeate side of the hollow fiber membrane. The permeated and the nonpermeated components are removed through or recovered from at least one permeate outlet and at least one nonpermeate outlet, respectively.

In some instances the membrane gas separation devices (assemblies) are designed to provide a purge or a sweep gas on the permeate side of the membrane. The use of a sweep gas on the permeate side of the membrane is beneficial in certain gas separation processes, such as gas dehydration processes, since it decreases the permeate side partial pressure of the more highly permeable component, thus allowing the gas mixture to be more thoroughly stripped of the more readily permeable component. The sweep gas typically flows countercurrently to the direction of the feed/nonpermeate flow. The use of a dry sweep gas can improve the product gas dryness as well as the productivity of the membrane device. A portion of the dry product gas is frequently utilized as the sweep gas generating an internal reflux system. The gas separation assembly that provides for sweep or purge gas introduction generally comprises an annular hollow fiber membrane bundle in an enclosure or a shell having a fluid feed inlet, a nonpermeate outlet, a permeate outlet and a sweep or purge gas inlet. Examples of such membrane assemblies can be found in U.S. Pat. Nos. 3,499,062; 3,735,558; 4,718,921; 5,108,464 and 5,026,479. These fluid separation devices, however, require the use of external plumbing and valves to regulate the flow of the sweep gas to be fed to the sweep gas inlet port. The need to manifold the dry sweep gas external to the gas separation apparatus adds to the size and the complexity of the device. Several attempts have been made to provide an internal sweep gas arrangement and an internal sweep gas flow control. U.S. Pat. Nos. 5,411,662 and 5,525,143 disclose such integral hollow fiber membrane devices.

It is well known in the art to employ hollow fiber membrane modules that consist of multiple internal zones and multiple stages. Such arrangements are employed to provide multiple purity products from a single membrane device, to improve module performance, and to introduce sweep/recycle arrangements. Examples of these module arrangements can be found in U.S. Pat. Nos. 4,220,535; 4,676,808; 5,160,042, and 6,153,097. In U.S. Pat. No. 5,013,437, a hollow fiber membrane fluid separation device adapted for bore side feed that contains multiple concentric zones is described. The device can produce an improved purity nonpermeate product stream. The permeate on the shell side of the device is controlled to maximize concentration gradients along the hollow fibers, thus enhancing the flow of permeate on the shell size of the device and rendering the device more efficient.

In U.S. Pat. Nos. 4,929,259; 4,676,808, and 5,169,530, hollow fiber membrane separation modules are described that contain a discreet zone formed by baffles placed in concentric or radial configurations. The baffles improve fluid contact with hollow fiber membranes. In U.S. Pat. No. 5,158,581, a hollow fiber membrane module is described having segregated active surface regions. In U.S. Pat. No. 5,288,308, a multiple-stage countercurrent hollow fiber membrane module with shell-side feed is described. The module contains multiple separation stages and the means of withdrawing two permeate streams. The apparatus further contains provisions for redirecting a fraction of one permeate stream as a sweep to the second permeate zone through a conduit external to the hollow fiber module. The design of a hollow fiber membrane gas separation apparatus is usually tailored towards specific gas separation processes. For example, a process that requires the use of a fraction of the nonpermeate gas as a sweep on the permeate side of the hollow fiber membrane utilizes a membrane cartridge and a housing enclosure that are substantially different from an apparatus used in a process that does not require the use of the sweep. Furthermore, the cartridge and the housing frequently cannot be used interchangeably for a number of different gas separation applications or, in some instances, even for the same gas separation application that simply requires a different level of product purity. This leads to a proliferation of specialized and frequently unique hollow fiber membrane devices currently employed in the field of gas separations.

The membrane gas separation apparatus is frequently utilized in conjunction with prefiltration equipment, such as coalescing filters, that remove oil and water droplets and a carbon trap that is used to remove heavy hydrocarbon vapors that can be harmful to membrane operation. The prevailing designs of membrane gas separation assemblies frequently make it more difficult to integrate the membrane device with the prefiltration equipment into a single compact gas separation unit. Thus there still exists a need in the art for a hollow fiber membrane gas separation apparatus of a simple design that can be used interchangeably in a number of different gas separation processes, including processes that require the use of a fraction of the product gas as a sweep and that can be integrated with the standard gas filtration equipment into a compact, functional gas separation system.

It is well known in the art that hollow fiber membrane module performance can be improved by increasing module length-to-diameter ratio (high aspect ratio), particularly for high-purity nonpermeate product generation. However, long modules can make it difficult to construct compact systems. It is thus an objective of this invention to provide a compact hollow fiber gas separation module with low length-to-diameter ratio that provides an improved performance for high-purity nonpermeate product generation.

It is another objective of this invention to provide a hollow fiber membrane cartridge that can be interchangeably installed into a standard gas filtration housing and functionally employed in a manner analogous to that of the standard gas filtration equipment.

It is another objective of this invention to provide a hollow fiber membrane gas separation apparatus that can be used in a number of different gas separation applications, including processes that utilize a fraction of the nonpermeate gas as a sweep internal to the device and are capable of generating end products of different purity with no modification to the housing and only an external adjustment to the membrane cartridge.

It is a further objective of this invention to provide a modular hollow fiber membrane gas separation/purification apparatus with feed gas inlet and product gas outlet interfaces that can be easily integrated with the gas prefiltration and post purification equipment into compact gas separation/purification systems.

SUMMARY OF THE INVENTION

According to one embodiment of the present invention, the above objectives and other objectives that are apparent to those skilled in the art are achieved by a gas separation apparatus comprising:

(i) a housing body defined by an essentially cylindrical bowl connected in a sealed and removable manner in correspondence with its axial end portion to a lid, wherein said lid having formed therethrough a feed gas inlet port and an outlet nonpermeate gas port and wherein said bowl being provided with a permeate gas exit port placed coaxially to said housing body, and (ii) a substantially cylindrical hollow fiber membrane gas separation cartridge placed coaxially in said housing body and connected in a sealed and removable manner with its first axial end to said feed gas inlet port or nonpermeate gas outlet port in the lid and with its second axial end to said permeate gas outlet port in the bowl said cartridge includes:

(a) an elongated tubular inner core member, (b) a substantially cylindrical hollow fiber membrane bundle surrounding said inner core member constructed from hollow fiber membranes having permeate and nonpermeate sides, said bundle being characterized as having a substantially countercurrent flow arrangement between the gas flow on said permeate side and the gas flow on said nonpermeate side.

(c) two tubular tubesheets encapsulating both ends of the hollow fiber bundle in a fluid-tight arrangement with one end of the inner core member opening out of one of the tubesheets to permit the flow of gas in and out of said inner core member and wherein at least one of said tubesheets is severed to permit unobstructed flow of gas in and out of the hollow fiber lumens, (d) a first and second end closure attached to said tubesheets in a fluid-tight arrangement wherein said first end closure is in fluid communication with said waste gas exit port, and wherein said second closure is equipped with a flow control orifice that allows a portion of the nonpermeate gas to be used as a sweep gas on the permeate side of said hollow fibers.

According to another embodiment of the present invention, the above objectives and other objectives that are apparent to those skilled in the art are achieved by gas separation apparatus comprising: (i) a housing body defined by an essentially cylindrical bowl connected in a sealed and removable manner in correspondence with its axial end portion to a lid wherein said lid having formed therethrough a feed gas inlet port and a nonpermeate gas outlet product port, and wherein said bowl being provided with a permeate gas exit port placed coaxially to said housing body, and (ii) a concentric multiple zone hollow fiber membrane cartridge adapted for shell side feed placed coaxially in said housing body and connected in a sealed and removable manner with its first axial end to said feed gas inlet port or said nonpermeate outlet port in the lid and with its second axial end to said permeate gas outlet port in the bowl, said cartridge includes:

(a) an elongated tubular inner core member in communication with said feed gas inlet port or said nonpermeate gas outlet port, (b) a substantially cylindrical hollow fiber membrane bundle positioned coaxially to and at least partially surrounding said inner core member constructed from hollow fiber membranes having permeate and nonpermeate sides, said bundle being characterized as having a substantially countercurrent flow arrangement between the gas flow on said permeate side and the gas flow on said nonpermeate side, (c) a first and second tubesheet encapsulating the opposite ends of said hollow fiber bundle in a fluid-tight arrangement with one end of the inner core member opening out of one of the tubesheets to permit the flow of gas in or out of said inner core member, said tubesheets are severed to permit unobstructed flow of gas in and out of the hollow fiber lumens, (d) at least one impermeable wall member extending longitudinally through said bundle and partitioning said bundle into at least the first and second section with the hollow fiber membranes partitioned between the sections, wherein said impermeable wall member contains a passageway in close proximity to one of said tubesheets, (e) the first and second end closure attached to said tubesheets in a fluid-tight manner wherein said first closure is in fluid communication with said permeate gas exit port, and wherein said second closure is equipped with a flow control orifice that allows a portion of the nonpermeate gas to be used as a sweep gas on the permeate side of said hollow fibers. In some embodiments the flow control orifice is omitted.

DETAILED DESCRIPTION OF THE INVENTION

Figure 1:
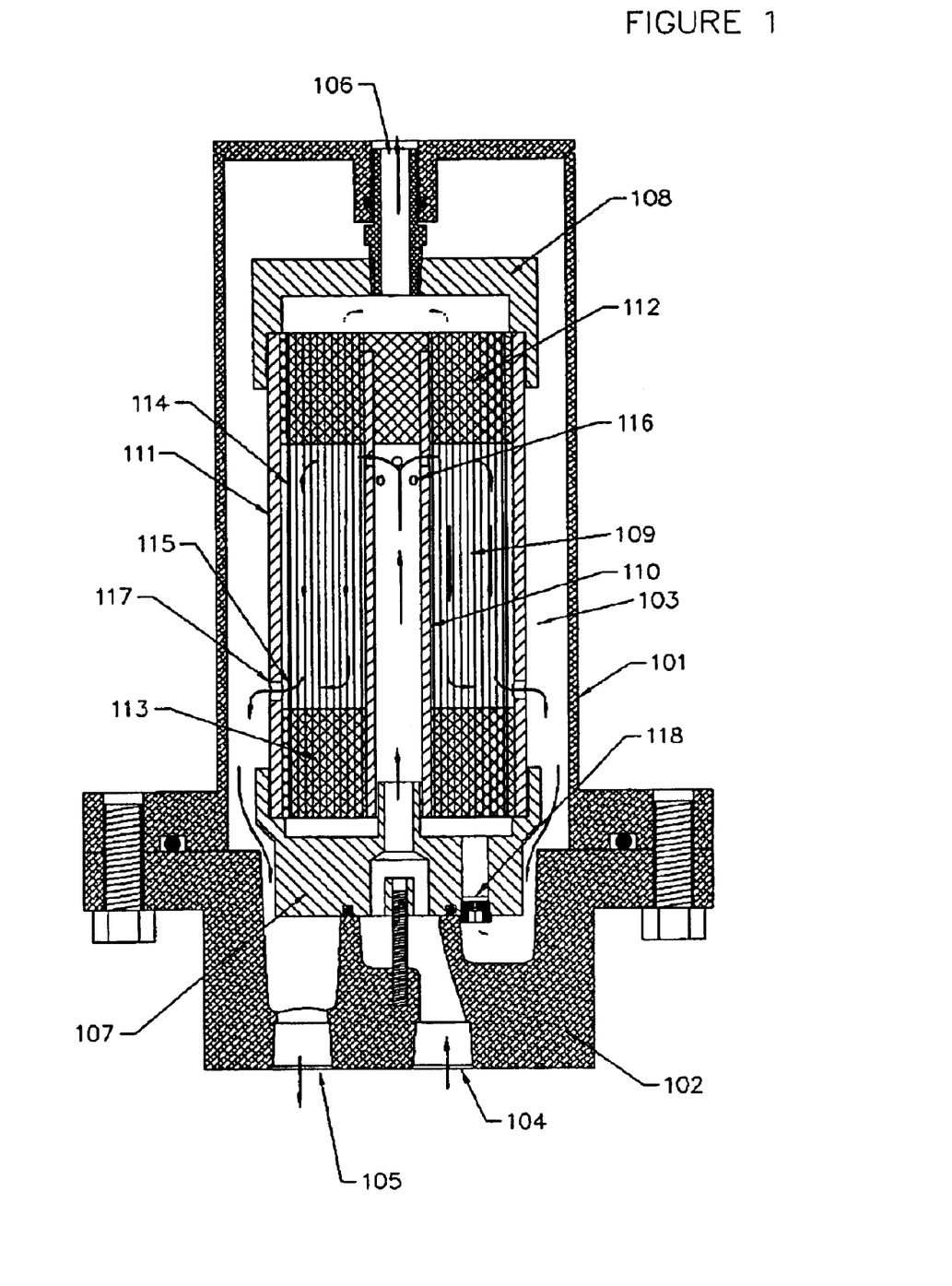
FIG. 1 is a sectional view of a hollow fiber membrane gas purification/separation apparatus in accordance with one embodiment of this invention, wherein the feed gas is introduced internally to the hollow fiber membrane cartridge and the product gas is removed externally of the hollow fiber membrane cartridge, and a portion of the purified nonpermeate product gas is used as a permeate side sweep, the fraction of the product gas utilized as the sweep being controlled by an interchangeable flow-control orifice.
Figure 2:
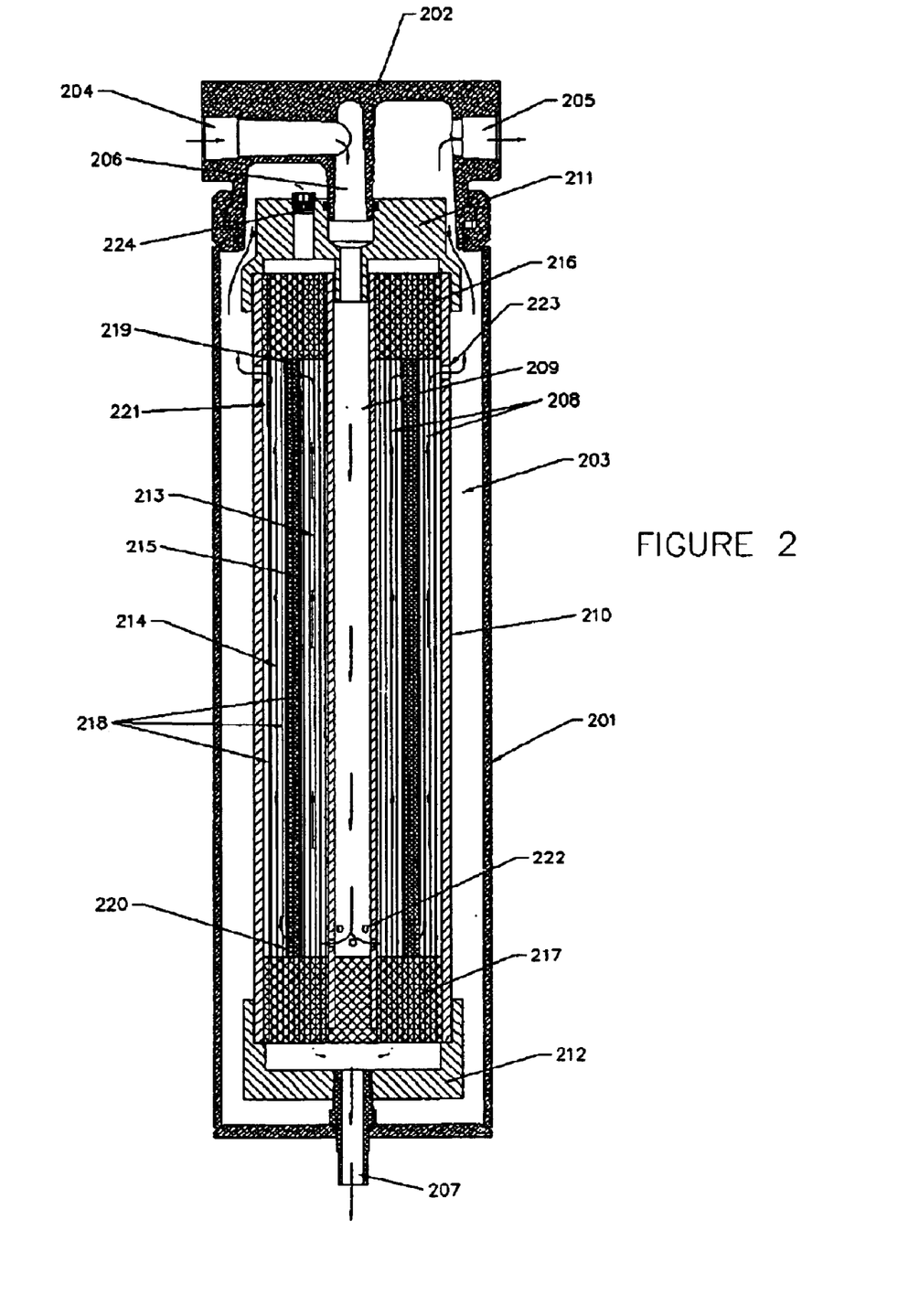
FIG. 2 is a sectional view of a hollow fiber membrane gas purification/separation apparatus in accordance with another embodiment of this invention, wherein the feed gas is introduced internal to the hollow fiber membrane cartridge and the product gas is removed external to the cartridge, and a portion of the purified product gas is used as a permeate side sweep, the fraction of the product gas utilized as the sweep being controlled by a flow-control orifice. The shell-side feed membrane cartridge is segmented and features a countercurrent flow configuration with a single feed and two separate sweep streams.
Figure 3:
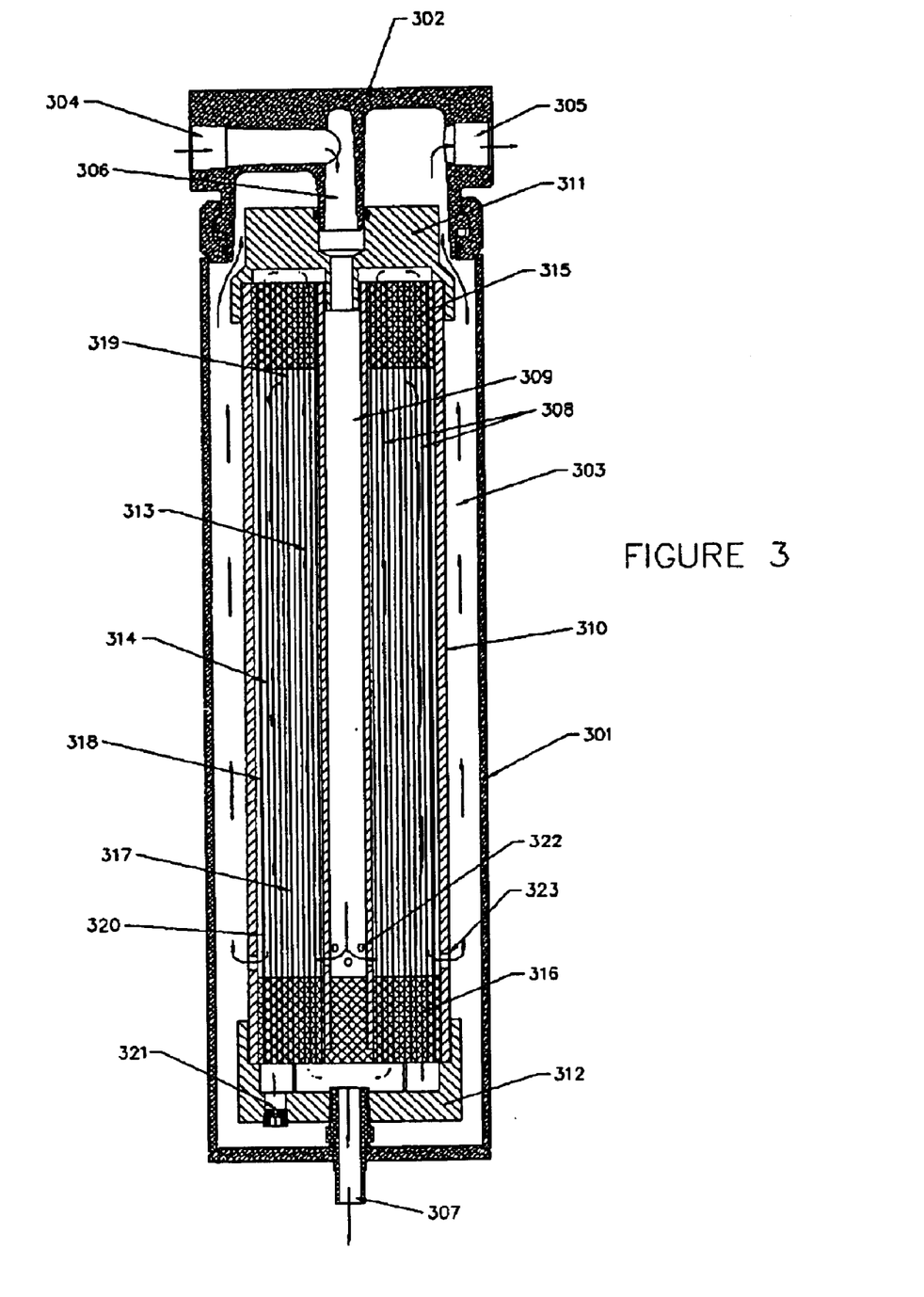
FIG. 3 is a sectional view of a hollow fiber membrane gas purification/separation apparatus in accordance with another embodiment of this invention wherein the feed gas is introduced internal to the hollow fiber cartridge and the nonpermeate product gas is collected external to the hollow fiber cartridge and a portion of the purified gas product is used as a permeate side sweep, the fraction of the product gas utilized as a sweep being controlled by a flow-control orifice. The shell-side feed membrane cartridge is segmented and features a countercurrent flow configuration between a single feed stream and a single sweep stream.
Figure 4:
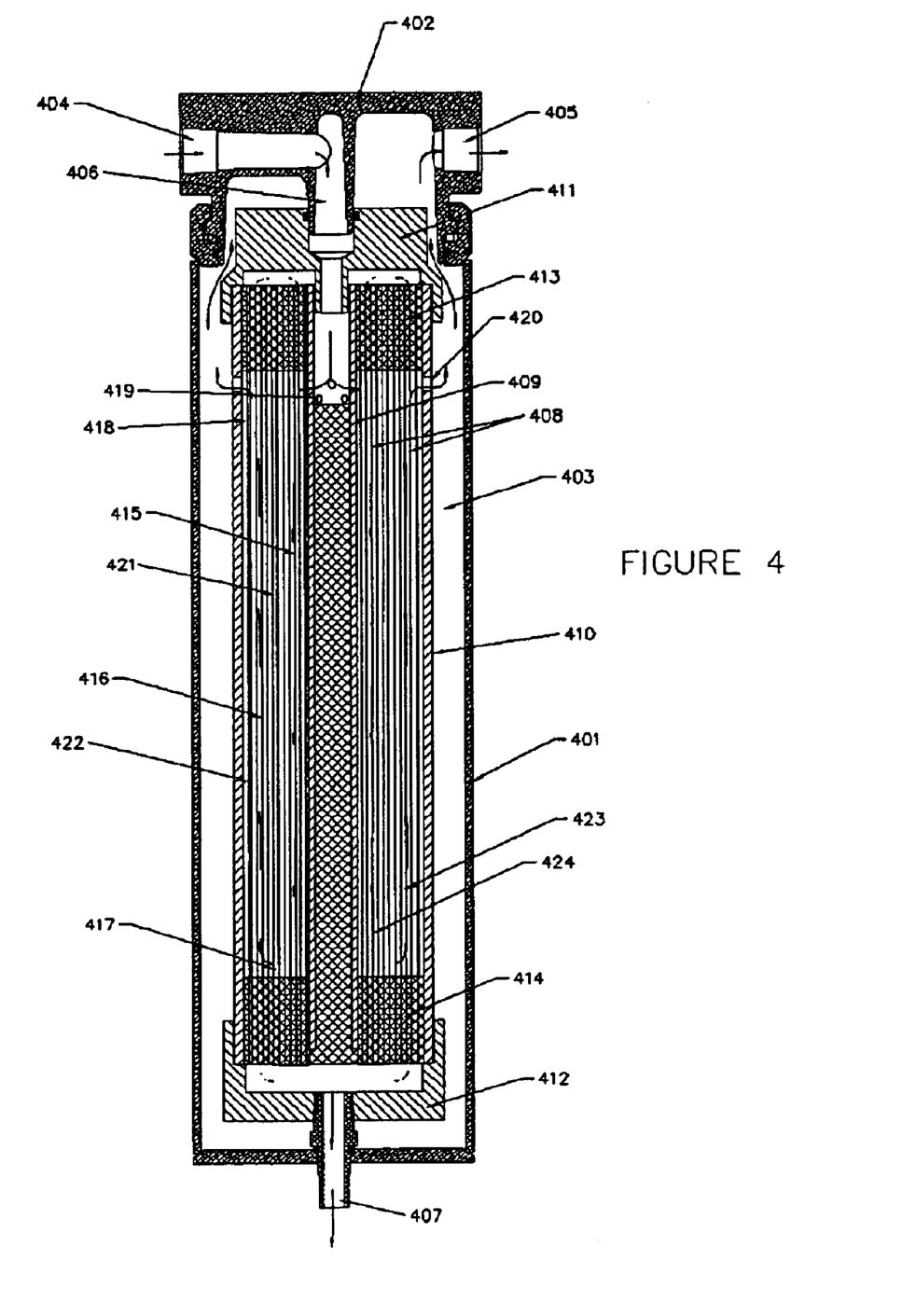
FIG. 4 is a sectional view of a hollow fiber membrane gas separation apparatus in accordance with another embodiment of this invention wherein the feed gas is introduced to the outside of the hollow fiber membranes and the permeate waste gas is withdrawn through the hollow fiber lumens. The membrane cartridge is segmented and features a countercurrent flow configuration between the feed and permeate streams.

Now referring to the drawings, preferred embodiments of the invention are described below:

FIG. 1 is a sectional view showing a hollow fiber membrane gas purification/separation apparatus in accordance with one embodiment of this invention. The gas purification apparatus comprises an outer housing body or a shell assembly defined by a bowl body 101 and a head closure, or a lid 102, and a hollow fiber membrane cartridge 103 positioned therein. The bowl body member 101 is essentially cylindrical in shape and is connected in a sealed and removable manner to a head closure member 102. The head closure 102 connects to the axial-end portion of the bowl body 101 in a removable manner by threads, by a bayonet connector, or by a flanged arrangement as shown in FIG. 1, or by any other fluid-tight sealing arrangement. The head closure 102 contains a feed gas inlet port 104 and a purified gas outlet port 105. The feed and product gas ports can be formed in the flat part of the lid 102, as shown in FIG. 1, or can be formed in a first and second end of the head closure and spaced in a straight line relative to one another, as shown in FIGS. 2, 3, and 4. The bowl 101 contains a waste gas exit port 106.

The housing is made from a metal or a plastic material and is designed to accommodate the hollow fiber membrane gas purification cartridge 103 placed in a chamber formed by the exterior of the housing. The apparatus of this invention is designed to operate at elevated feed pressure with a low feed to nonpermeate product pressure drop. The feed gas can be processed at a pressure as high as 100 atm or higher and is frequently processed at feed pressures from about 8 to 10 atm.

The hollow fiber membrane gas purification cartridge of this invention is positioned in the chamber formed by the exterior housing. The cylindrical hollow fiber membrane cartridge is connected in a sealed and removable manner by its first terminal axial end formed by the cap 107 to the lid 102 and with its second terminal axial end formed by the cap 108 to the waste gas outlet port 106 in the bowl 101. The cartridge can be attached to the bowl or to the lid by threaded connections. The connections between the cartridge and the lid and the cartridge and the bowl are sealed with o-rings that provide a fluid-tight seal between the feed, nonpermeate, and permeate streams.

The hollow fiber membrane cartridge 103 comprises an annular hollow fiber membrane bundle 109 arranged around the hollow core tube member 110, surrounded by a shell 111 (optional) and axial end closures or caps 107 and 108. The shell 111 is provided to protect the cartridge during handling and/or for structural support and can be omitted in some embodiments. The bundle 109 is formed by a multiplicity of hollow fiber membranes uniformly arranged around the tubular member 110. The tubular core member is shown to extend through the entire length of the cartridge. However, in some embodiments, the core member can extend only partially through the bundle. The primary function of the core member is to provide a flow conduit into or out of the bundle. It can also serve as a structural support. One preferred method of forming a uniformly structured hollow fiber bundle is by winding the hollow fibers around the tubular member 110. Both ends of the hollow fiber membrane bundle 109 are encapsulated in tubesheets 112 and 113 in a fluid-tight arrangement with one end of the inner core tube member 110 opening out of the tubesheet 113. The tubesheet ends are severed to allow for unobstructed gas flow from and into the hollow fiber lumens. The exposed hollow fiber membrane bundle between the tubesheets 112 and 113 may be encased, as shown in FIG. 1, with an essentially nonpermeable film barrier or a wrap 114 except for a non-encased circumferential region 115 adjacent to the tubesheet 113. The wrap 114 is designed to prevent the gas from bypassing the hollow fiber bundle body and to improve uniformity of gas flow through the bundle. The gas flow passageways in the membrane cartridge 103 are arranged to provide for a thermodynamically efficient countercurrent flow of gas streams between the shell side and the lumen side of the hollow fiber membranes. The feed gas is introduced into the hollow fiber bundle 109 through openings 116 in the tubular core member 110 and the nonpermeate product gas is removed through the gap 115 and openings 117 in the external shell 111. The openings 116 and 117 are positioned adjacent to tubesheets 112 and 113, respectively. The permeate gas is withdrawn through the open ends of the hollow fiber lumens on the axial surface of the tubesheet 112. This flow arrangement ensures a substantially countercurrent flow of the feed gas with respect to the permeate gas. The cartridge 103 is further equipped with a flow-control orifice 118 that provides for introduction of a fraction of the nonpermeate gas as a sweep. The orifice 118 is preferably a replaceable orifice attached to the cap 107 by a thread or a similar detachable arrangement. The placement of the orifice 118 can be omitted from the embodiments that do not require the use of the sweep gas internal to the cartridge. Furthermore, the cartridge 103 shown in FIG. 1 can be converted from a cartridge that utilizes the sweep to a cartridge that does not utilize the sweep by sealing the gas passageway in the orifice 118.

It is well known in the art that the sweep gas can be introduced into the lumens of the hollow fibers through an uncoated hollow fiber section adjacent to a tubesheet distal from the permeate removal end. Preparation of membrane cartridges with such internal sweep configuration is disclosed in U.S. Pat. Nos. 4,687,578 and 6,180,168. It is within the scope of this invention to utilize coated hollow fiber membranes containing an uncoated section to be used for introduction of the sweep gas. In such embodiments the flow control orifice can be omitted. Furthermore, in such embodiments the tubesheet 113 can be left unsevered since the need for introducing the sweep gas through the tubesheet has been eliminated, and the flow channel in the internal core member 110 can be optionally directly connected to a gas flow port in the lid 102, eliminating the need for the end cap closure 107 as well.

In the gas purification/separation process of this invention the feed gas is introduced into the apparatus through the feed port 104 that connects to tubular core member 110. The hollow tubular core member serves as a gas transport conduit. The feed gas is then channeled through openings 116 into the shell side of the hollow fiber membrane bundle 109 wherein the feed gas is brought into contact with the exterior of hollow fiber membranes. The feed gas stripped of the undesirable impurities that were removed by permeation into the hollow fiber lumens is then transported through the gap 115 and openings 117 in the exterior cartridge shell and is collected as a product nonpermeate gas through the exit port 105. A fraction of the nonpermeate gas is directed through the orifice 118 into the hollow fiber lumens and is used as a sweep gas on the permeate side of the hollow fibers. The combined permeate/sweep flow stream is removed from the apparatus as a waste gas through the port 106. The orifice 118 is an interchangeable flow-control orifice that is sized to allow a predetermined amount of nonpermeate gas to be used as a sweep. The amount of sweep gas in turn determines the level of product purity. The amount of sweep gas as a fraction of the product gas can vary from 0.01 to 0.8 and is typically between 0.1 and 0.4. The advantageous feature of the cartridge of this invention is that the same cartridge can be used to generate different purity products by simply changing the size of the orifice. The cartridge can be used for gas separation applications that do not require the use of sweep gas by simply blocking or eliminating the orifice 118.

The apparatus shown in FIG. 1 utilizes a hollow fiber membrane cartridge wherein the feed gas is introduced internal to the cartridge and the nonpermeate gas is withdrawn external to the cartridge. However, it will be obvious to those skilled in the art that the design can be modified to allow for a reverse flow configuration.

FIGS. 2, 3 and 4 show sectional views of the gas separation devices of this invention, which employ hollow fiber membrane cartridges that are segmented into concentric flow zones. The cartridges feature shell side feed configuration with permeate gas removal through the hollow fiber lumens. The cartridges in FIG. 2 and FIG. 3 further contain a provision of utilizing a fraction of the product gas as a sweep on the permeate side of the membrane internal to the device. The cartridges exhibit a countercurrent flow configuration between the gas stream on the shell side and lumen side of the hollow fiber membrane, respectively. The feed gas flow on the shell side and the permeate/sweep gas flow on the lumen side in the concentric zones of the segmented hollow fiber cartridge are controlled to minimize concentration gradients along the hollow fibers to minimize back mixing, thus enhancing mass transfer and rendering the device more efficient.

FIG. 2 is a sectional view showing a hollow fiber membrane gas purification/separation apparatus in accordance with another embodiment of this invention. The apparatus shown in FIG. 2 utilizes a hollow fiber membrane cartridge that is divided into a number of concentric zones wherein the feed gas is introduced internal to the cartridge and the nonpermeate gas is withdrawn external to the cartridge. The gas purification apparatus comprises an outer housing body or a shell assembly and a hollow fiber membrane cartridge 203 positioned therein. The outer housing is defined by a bowl body member 201 that is essentially cylindrical in shape and is connected in a sealed and removable manner to a head closure member, or a lid 202. The lid 202 connects to the axial-end portion of the bowl body 201 in a removable manner by a bayonet connector or by any other fluid-tight sealing arrangement. The head closure 202 contains a feed gas inlet port 204, a purified gas outlet port 205, and a gas flow conduit 206. The feed and product gas ports are formed in a first and second end of the head closure 202 and are spaced essentially in a straight line relative to one another. The gas transfer conduit 206 is positioned coaxially to the housing body and is in fluid communication with the inlet port 204. The bowl 201 contains a waste gas exit port 207.

The cylindrical hollow fiber membrane cartridge 203 is connected in a sealed and removable manner by its first axial end defined by the cap 211 to the gas transfer conduit 206 in the head closure 202 and with its second axial end defined by the cap 212 to the waste gas outlet port 207 in the bowl 201.

The hollow fiber membrane cartridge 203 comprises a segmented annular hollow fiber membrane bundle 208 arranged around the hollow core tube member 209, surrounded by shell 210 and axial end caps 211 and 212. The shell 210 is provided primarily for protection during cartridge handling and/or for structural support and can be omitted in some embodiments. The bundle 208 is formed by a multiplicity of hollow fiber membranes uniformly arranged around the tubular member 209 in two concentric zones 213 and 214 separated by a flow channel 215. One preferred method of forming a uniformly structured hollow fiber bundle is by winding the hollow fibers around the tubular member 209. Both ends of the hollow fiber membrane bundle 208 are encapsulated in tubesheets 216 and 217 in a fluid-tight arrangement with one end of the inner core tube member 209 opening out of the tubesheet 216. The tubesheet ends are severed to allow for unobstructed gas flow from and into the hollow fiber lumens. The exposed hollow fiber membrane bundle between the tubesheets 216 and 217 is encased, as shown in FIG. 2, with essentially nonpermeable film barriers or wraps 218 except for non-encased circumferential region 219, 220 and 221 adjacent to the tubesheets. The barriers 218 divide the cartridge into three concentric zones/flow channels, i.e., two hollow fiber membrane sections 213 and 214 with a flow channel 215 interspersed therebetween. The membranes in the first and second concentric sections can be the same or different. If the membranes in both sections are the same, the barrier placement is frequently selected such as to divide the membrane area equally between the two sections of the cartridge. The channel 215 is formed by placing a flow spacer or a net between hollow fiber regions 213 and 214. The gas flow passageways in the membrane cartridge 203 are arranged to provide for a thermodynamically efficient countercurrent flow arrangement between the feed/ nonpermeate stream on the shell side and the permeate/ sweep stream on the lumen side of the hollow fiber membranes, respectively. The feed gas is introduced into hollow fiber cartridge 203 through openings 222 in the internal core member 209 and the nonpermeate product gas is removed through openings 223 in the external shell 210. The openings 222 and 223 are positioned adjacent to the tubesheets 217 and 216, respectively. The permeate gas is withdrawn through the open ends of the hollow fiber lumens in the axial surface of the tubesheet 217. This flow arrangement ensures a substantially countercurrent flow of the feed gas with respect to the permeate gas. The cartridge 203 is further equipped with a flow-control orifice 224 that provides for introduction of a fraction of the nonpermeate gas as a sweep. The orifice 224 is positioned in cap 211. The orifice 224 is preferably a replaceable orifice attached to the cap by a threaded or a similar detachable arrangement.

In the gas purification/separation process of this invention the feed gas is introduced into the apparatus shown in FIG. 2 through the feed port 204 that connects to gas transport conduit 206. The feed gas is then transported into internal core member 209. The feed gas is channeled through the openings 222 into the shell side of the hollow fiber membrane bundle in zone 213 wherein the feed gas is brought into contact with the exterior of hollow fiber membranes. The gas exits from the first hollow fiber section 213 through the gap 219 and is transported to the opposite end of the cartridge through the channel 215. The gas reenters the second hollow fiber section 214 through the gap 220 wherein the gas direction is again reversed and exits this section through the gap 221. The gas stripped of the undesirable impurities that were removed by permeation into the hollow fiber lumens in sections 213 and 214 exits the hollow fiber through the openings 221 in the external shell 210 and is collected as a product nonpermeate gas through the exit port 205. A fraction of the nonpermeate gas is directed through the orifice 224 into the hollow fiber lumens and is used as a sweep gas on the permeate side of the hollow fibers in zones 213 and 214. The combined permeate/sweep flow stream is removed from the apparatus as a waste gas through the port 207. The orifice 224 is a flow-control orifice that is sized to allow a predetermined amount of nonpermeate gas to be used as a sweep. The amount of sweep gas in turn determines the level of product purity. FIG. 3 is a sectional view showing a hollow fiber membrane gas purification/ separation apparatus in accordance with another preferred embodiment of this invention. The apparatus shown in FIG. 3 utilizes a segmented hollow fiber membrane cartridge wherein the feed gas is introduced internal to the cartridge and the product nonpermeate gas is collected external to the cartridge. The gas purification apparatus comprises an outer housing body or a shell assembly and a hollow fiber membrane cartridge 303 positioned therein. The outer housing is defined by a bowl body member 301 that is essentially cylindrical in shape and is connected in a sealed and removable manner to a head closure member, or a lid 302. The lid 302 connects to the axial-end portion of the bowl body 301 in a removable manner by a bayonet connector or by any other fluid-tight sealing arrangement. The head closure 302 contains a feed gas inlet port 304, a purified product gas outlet port 305, and a gas flow conduit 306. The feed and product gas ports are formed in a first and second end of the head closure 302 and are spaced essentially in a straight line relative to one another. The gas flow conduit 306 is placed coaxially to the housing body and in fluid communication with the feed port 304. The bowl 301 contains a waste gas drain port 307.

The cylindrical hollow fiber membrane cartridge 303 is connected in a sealed and removable manner by its first axial end to the gas flow conduit 306 in the lid 302 and with its second axial end to the waste gas outlet port 307 in the bowl 301.

The hollow fiber membrane cartridge 303 comprises a segmented annular hollow fiber membrane bundle 308 arranged around the hollow core tube member 309, surrounded by a shell 310 and axial end closures or caps 311 and 312. The cap 312 contains an internal partition that is sealed against the tubesheet 316. The bundle 308 is formed by a multiplicity of hollow fiber membranes uniformly arranged around the tubular member 309. One preferred method of forming a uniformly structured hollow fiber bundle is by winding hollow fibers around the tubular member 309. The hollow fiber bundle 308 is divided into two concentric sections or zones 313 and 314. The hollow fiber membranes in zones 313 and 314 can be the same or different. If the hollow fibers in both zones are identical, the zones preferably will contain an essentially equal amount of membrane area. Both ends of the hollow fiber membrane bundle 308 are encapsulated in tubesheets 315 and 316 in a fluid-tight arrangement with one end of the inner core tube member 309 opening out of the tubesheet 315. The tubesheet ends are severed to allow for unobstructed gas flow from and into the hollow fiber lumens. The exposed hollow fiber membrane bundle between tubesheets 315 and 316 is encased with essentially nonpermeable film barriers or wraps 317 and 318 except for non-encased circumferencial regions 319 and 320 adjacent to tubesheets 315 and 316, respectively. The barriers divide the cartridge into two concentric zones/flow channels. The barriers are placed such as to optimize cartridge performance. The gas flow passageways in the membrane cartridge 303 are arranged to provide for a thermodynamically efficient countercurrent flow arrangement between the feed/nonpermeate stream on the shell side of the hollow fiber membranes and the permeate/ sweep stream on the bore side of the hollow fiber membranes, respectively. The cartridge 303 is further equipped with a flow control orifice 321 that provides for introduction of a fraction of the nonpermeate gas as a sweep. The orifice 321 is positioned in the cap 312 such that the sweep gas is introduced into the lumens of the hollow fibers in the external hollow fiber cartridge section 314 only. The placement of the orifice 321 can be omitted from the embodiments that do not require the use of sweep gas. The feed gas is introduced into the shell side of the hollow fibers through openings 322 in the core member 309 and the nonpermeate product gas is removed through opening 323 in the external shell 310. The permeate gas from the lumen side of the hollow fiber membranes is withdrawn through the waste gas exit port 307.

In the gas purification/separation process of this invention, the feed gas is introduced into the apparatus of FIG. 3 through the feed port 304 that connects to the tubular core member 309. The feed gas is then introduced sequentially into the first and second zone of the cartridge wherein the feed gas is brought into contact with the shell side of the hollow fiber membranes. The gas stripped of undesirable impurities that were removed by permeation into the lumens of the hollow fibers is then transported through the opening 323 in the shell 310 and is collected as a product nonpermeate gas through the exit port 305. A fraction of the nonpermeate gas is directed through the orifice 321 into the lumen side of the hollow fibers in the external section 314 of the cartridge. The combined permeate/sweep gas stream exiting the external section 314 is then redirected as a sweep into the lumens of the hollow fibers of the internal section 313 and is used as a sweep gas on the permeate side of the hollow fibers located in this section. The combined permeate/sweep flow stream that exits the internal section 315 is removed from the cartridge through the waste gas exit port 307. The orifice 321 is a flow-control orifice that is sized to allow a predetermined amount of nonpermeate gas to be used as a sweep. The amount of sweep gas in turn determines the level of product purity. The cartridge 303 can be used for gas separation applications that do not require the use of the sweep gas by simply blocking or eliminating orifice 321.

FIG. 4 is a sectional view showing a hollow fiber membrane gas purification/separation apparatus in accordance with another embodiment of this invention, wherein the feed gas is introduced to the outside of the hollow fiber membranes and the permeate waste gas is withdrawn through the hollow fiber lumens. The gas purification apparatus comprises an outer housing body or a shell assembly and a hollow fiber membrane cartridge 403 positioned therein. The outer housing is defined by a bowl body member 401 that is essentially cylindrical in shape and is connected in a sealed and removable manner to a head closure member, or a lid 402. The lid 402 connects to the axial-end portion of the bowl body 401 in a removable manner by a bayonet connector or by any other fluid-tight sealing arrangement. Preferably the housing is a standard gas filtration shell utilized extensively in the art that is adopted to house the hollow fiber membrane gas purification cartridge of this invention.

The head closure 402 contains a feed gas inlet port 404, a purified gas outlet port 405, and a gas flow conduit 406. The feed and product gas ports are formed in a first and second end of the head closure 402 and are spaced essentially in a straight line relative to one another. The gas flow conduit 406 is positioned coaxially to the housing body and in fluid communications with gas inlet port 404. The bowl 401 contains a permeate gas exit port 407.

The cylindrical hollow fiber membrane cartridge 403 is connected in a sealed and removable manner by its first axial end to the gas flow conduit 406 in the lid 402 and with its second axial end to the waste gas outlet port 407 in the bowl 401.

Figure 5:
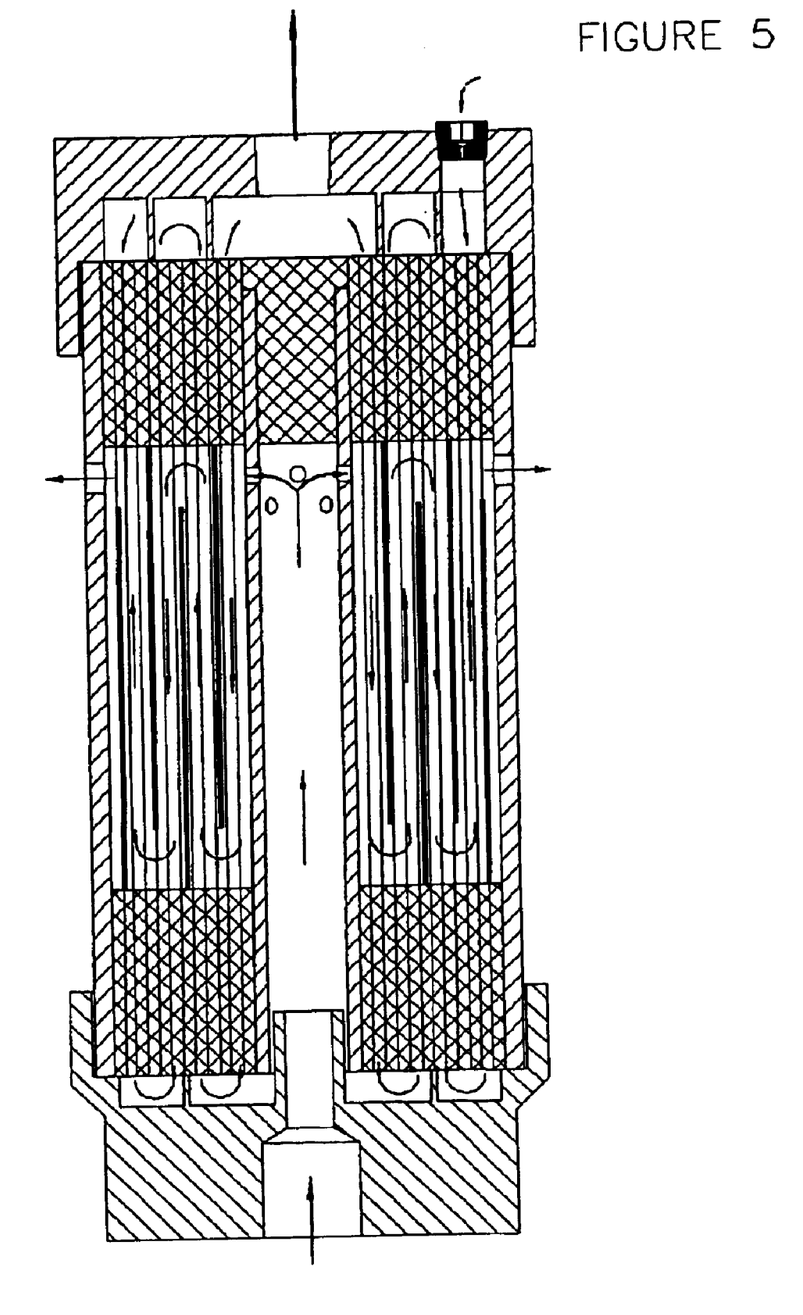
FIG. 5 is a sectional view of a hollow fiber membrane gas separation cartridge in accordance with another embodiment of this invention. The membrane cartridge is segmented into four zones and features a countercurrent flow configuration between the feed and permeate streams.

The hollow fiber membrane cartridge 403 comprises a segmented annular hollow fiber membrane bundle 408 arranged around the hollow core tube member 409, surrounded by the shell 410 and axial end caps 411 and 412. The bundle 408 is formed by a multiplicity of hollow fiber membranes uniformly arranged around the tubular member 409. Both ends of the hollow fiber membrane bundle 408 are encapsulated in tubesheets 413 and 414 in a fluid-tight arrangement with one end of the inner core tube member 409 opening out of the tubesheet 413. The end of the tubesheet 413 is severed to allow for unobstructed gas flow from the hollow fiber lumens in section 415 and into the hollow fiber lumens of section 416. Only the region corresponding to the section 416 of the tubesheet 414 is severed to allow the flow of gas out of the hollow fiber lumens of this section. The exposed hollow fiber membrane bundle between the tubesheets 413 and 414 is encased, as shown in FIG. 4, with essentially nonpermeable film barriers or wraps 421 and 422 except for non-encased circumferential regions 417 and 418 adjacent to the tubesheets 414 and 413, respectively. The gas flow passageways in the membrane cartridge 403 are arranged to provide for a thermodynamically efficient countercurrent flow arrangement between the feed/nonpermeate stream on the shell side and the permeate on the lumen side of the hollow fiber membranes, respectively. The feed gas is introduced into the hollow fiber bundle 408 through openings 419 in the tubular core member 409 and the nonpermeate product gas is removed through openings 420 in the external shell 410. The openings 419 and 420 are positioned adjacent to the tubesheets 413. The permeate gas is withdrawn through the open ends of the hollow fiber lumens of section 416 in the axial surface of the tubesheet 414. This flow arrangement ensures a substantially countercurrent flow of the feed gas with respect to the permeate gas. In the gas purification/separation process of this invention the feed gas is introduced into the apparatus of FIG. 4 through the feed port 404 that connects through conduit 406 to the tubular core member 409. The feed gas is channeled through the openings 419 into the shell side of the hollow fiber membranes in section 415, wherein the feed gas is brought into contact with the exterior of hollow fiber membranes. The feed gas stripped of a portion of the fast gas permeating components is then transported through gap 417 into the shell side of hollow fiber in section 416 wherein an additional fraction of the fast gas permeating components is removed. The gas stripped of the fast gas permeating components that were removed by permeation into the hollow fiber lumens in sections 415, 416, 423 and 424 is then transported through the openings 420 in the external shell 410 and is collected as a product nonpermeate gas through the exit port 405. The permeate gas collected from the lumens of the hollow fibers in section 416 is directed as a sweep into the lumens of the hollow fibers in section 415. The combined permeate gas from both sections is then removed from the device through the exit port 407. The flow dynamics in cartridges with exceedingly low length to diameter ratio can be further improved by increasing the number of sections while maintaining an overall countercurrent flow configuration between the gas streams on the shell side and the lumen side of the hollow fiber membranes. An example of such a cartridge with four concentric sections is shown in FIG. 5.

The cartridge is divided into four concentric sections with the feed gas being introduced internal to the cartridge and channeled progressively through the shell side of each section. The retentate gas is withdrawn external to the cartridge. The feed gas direction is reversed upon entry into each consecutive section.

A controlled amount of nonpermeate gas is introduced as a sweep into the external-most section of the cartridge through a fixed orifice positioned in the top cap. The sweep gas, combined with the permeate gas, is then channeled progressively from each external-most section to the next one and is finally removed from the cartridge through the exit port in the top cap. Partitions that are placed in both the top and bottom caps and which are sealed against the tubesheets force the combined sweep and permeate streams that emerge from the hollow fiber lumens of each section into the hollow fiber lumens in the next concentric section. A countercurrent feed-to-permeate flow arrangement is maintained in each section.

The membrane gas separation devices of this invention are frequently utilized in conjunction with prefiltration equipment, such as coalescing filters that remove oil and water droplets, particle filters, and carbon traps that are used to remove heavy hydrocarbon vapors that can be harmful to membrane operations. In some embodiments, membrane separation apparatus is employed in conjunction with the gas post purification device placed in the back of the membrane separator. One of the advantageous features of the hollow fiber gas separation apparatus of this invention is the positioning of the feed and the product ports, which allows for compact integration with prefiltration and/or post purification devices. The housing that contains the hollow fiber membrane cartridges of this invention is of a design extensively used in the gas filtration field. The feed entrance port of the membrane housing can be connected to the outer ports of the filtration housing of a similar design, wherein the feed and outlet ports of both housings are spaced essentially in a straight line for a short overall distance. Analogous connections can be made between the hollow fiber membrane gas separation apparatus and a post purification apparatus providing for a linear connection of feed and product ports of a shortest possible distance that is preferred in system packaging.

The apparatus of this invention can be used in a number of gas separation and gas purification applications. Assemblies that incorporate the use of a fraction of the nonpermeate gas as a permeate side sweep are particularly useful for removal of water vapor from a pressurized gas stream, such as the dehydration of compressed air and natural gas. Water vapors can condense in the membrane apparatus during dehydration operation, in particular, when the feed gas saturated with water vapor is introduced into a membrane device maintained at a temperature below that of the incoming gas. The membrane gas dehydration devices of this invention can be further equipped with a liquid drain assembly, which is preferably positioned in the lower section of the housing body. The devices of this invention can be further equipped with a heating jacket/heating mantle if the gas separation operation above an ambient temperature is preferred. In other embodiments the devices of this invention can be used to generate nitrogen-enriched air by separating oxygen from nitrogen, to remove volatile organic hydrocarbons from air, and for natural gas sweetening by preferential permeation of carbon dioxide and the like gas separation applications. In these gas separation processes, the nonpermeate gas is recovered at elevated pressure as a product. The apparatus of this invention can be further utilized for gas separation processes that generate product gas by permeation through the membrane, such as hydrogen recovery from hydrogen-containing gas streams. The permeate product gas is collected in these cases through the permeate gas port at a reduced pressure, and the nonpermeate gas at elevated pressure is recovered through the nonpermeate gas exit port.

The term "comprising" is used herein as meaning "including but not limited to", that is, as specifying the presence of stated features, integers, steps or components as referred to in the claims, but not precluding the presence or addition of one or more other features, integers, steps, components, or groups thereof.

Specific features of the invention are shown in one or more of the drawings for convenience only, as each feature may be combined with other features in accordance with the invention. Alternative embodiments will be recognized by those skilled in the art and are intended to be included within the scope of the claims.

What is claimed is:

1. A hollow fiber membrane gas separation apparatus comprising (i) a housing body defined by an essentially cylindrical bowl connected in a sealed and removable manner in correspondence with its axial end portion to a lid, wherein said lid having formed therethrough a feed gas inlet port and an outlet nonpermeate gas port and wherein said bowl being provided with a permeate gas exit port placed coaxially to said housing body, and (ii) a substantially cylindrical hollow fiber membrane gas separation cartridge placed coaxially in said housing body and connected in a sealed and removable manner with its first axial end to said feed gas inlet port or said nonpermeate gas outlet port in said lid and with its second axial end to said permeate gas exit port in the bowl, said cartridge includes:
    (a) an elongated tubular inner core member in communication with said feed gas inlet port or said outlet nonpermeate gas port,
    (b) a substantially cylindrical hollow fiber membrane bundle positioned coaxially to and at least partially surrounding said inner core member constructed from hollow fiber membranes having permeate and nonpermeate sides, said bundle being characterized as having a substantially countercurrent flow arrangement between the gas flow on said permeate side and the gas flow on said nonpermeate side,
    (c) a first and second tubesheet encapsulating the opposite ends of the hollow fiber bundle in a fluid-tight arrangement with one end of the inner core member opening out of one of the tubesheets to permit flow of gas in or out of said inner core member, said tubesheets are severed to permit unobstructed flow of gas in and out of the hollow fiber lumens,
    (d) a first and second end closure attached to said tubesheets in a fluid-tight arrangement, wherein said first end closure is in fluid communication with said permeate gas exit port, and wherein said second closure is equipped with a flow control orifice that allows a portion of the nonpermeate gas to be used as a sweep gas on the permeate side of said hollow fibers.

2. The apparatus of claim 1 wherein said orifice is replaceably attached to said second end closure.

3. The apparatus of claim 1 wherein said hollow fiber bundle is further surrounded by a shell.

4. The apparatus of claim 1 wherein said cylindrical bowl is connected to said lid by a bayonet connection or by a flanged connection.

5. The apparatus of claim 1 wherein said permeate gas exit port is used to remove a waste gas from said apparatus and said non permeate gas outlet port is used to collect a product gas.

6. The apparatus of claim 1 further containing a liquid removal port positioned in said housing body.

7. The apparatus of claim 1 wherein said hollow fiber membranes are wound around said tubular inner core member.

8. The apparatus of claim 1 wherein the feed gas is introduced internal to said cartridge and the nonpermeate product gas is removed external to said cartridge.

9. The apparatus of claim 1 wherein the feed gas is introduced externally to said cartridge and the nonpermeate product gas is withdrawn internally to said cartridge.

10. The apparatus of claim 1 wherein said first end closure is connected by threads to said waste gas outlet port in the bowl or to the gas outlet port in the lid.

11. The apparatus of claim 1 wherein connections of said first and second axial ends of the cartridge to the lid and the bowl, respectively, are sealed with o-rings.

12. The apparatus of claim 1 wherein said hollow fiber membrane bundle is incased with a nonpermeable wrap except for a narrow gap adjacent to one of said tubesheets.

13. A process for separating at least one gas component in a multicomponent gas mixture from at least one other gas component in said multicomponent gas mixture by bringing said mixture into contact with a first side of the hollow fiber gas separation membranes having a first and a second side, said membranes being assembled in a hollow fiber membrane apparatus of claim 1, permeating a portion of said one gas component to the second side of said hollow fiber membranes and recovering a nonpermeate gas depleted from said one gas component from the first side of said hollow fiber membranes and utilizing a fraction of said nonpermeate gas as a sweep on the permeate side of the hollow fiber membranes.

14. A gas separation process of claim 13 wherein said gas mixture is a compressed air stream or a high pressure natural gas stream and said one gas component is water vapor.

15. A concentric multiple zone hollow fiber membrane cartridge adapted for shell side feed comprising:
   (a) an elongated tubular inner core member in communication with a feed gas inlet port or a nonpermeate gas outlet port,
   (b) a substantially cylindrical hollow fiber membrane bundle positioned coaxially to and at least partially surrounding said inner core member constructed from hollow fiber membranes having permeate and nonpermeate sides, said bundle being characterized as having a substantially countercurrent flow arrangement between the gas flow on said permeate side and the gas flow on said nonpermeate side,
   (c) a first and second tubesheet encapsulating the opposite ends of said hollow fiber bundle in a fluid-tight arrangement with one end of the inner core member opening out of one of the tubesheets to permit the flow of gas in or out of said inner core member, said tubesheets are severed to permit unobstructed flow of gas in and out of the hollow fiber lumens,
   (d) at least one impermeable wall member extending longitudinally through said bundle and partitioning said bundle into at least first and second concentric sections with the hollow fiber membranes partitioned between each of the concentric sections, wherein said impermeable wall member contains a passageway in close proximity to one of said tubesheets,
   (e) first and second end closures attached to said tubesheets in a fluid-tight manner wherein said first closure is in fluid-tight communication with a permeate gas exit port.

16. The apparatus of claim 15 wherein said second closure is equipped with a flow control orifice that allows a portion of the nonpermeate gas to be used as a sweep gas on the permeate side of said hollow fibers.

17. The apparatus of claim 16 wherein a gas flow transfer channel is further placed between said first and second section of the hollow fiber cartridge.

18. The hollow fiber cartridge of claim 15 wherein said hollow fiber membranes are wound around said inner core member.

19. The hollow fiber cartridge of claim 15 wherein the entire hollow fiber bundle between the tubesheets is surrounded by an impervious wrap except for a narrow gap adjacent to one of said tubesheets.

20. The hollow fiber cartridge of claim 15 wherein said tubular inner core member is a feed flow gas inlet conduit or a product gas outlet conduit.

21. The apparatus of claim 15 wherein hollow fiber membranes in said first and second section exhibit different gas separation properties.

22. The apparatus of claim 15 wherein said cartridge contains at least one additional impermeable wall member and at least one additional concentric section that contains hollow fiber membranes.

23. The apparatus of claim 15 wherein said cartridge contains two additional impermeable wall members and four concentric sections that contain hollow fiber membranes.

24. The apparatus of claim 15 which further comprises a shell surrounding said bundle.

25. The apparatus of claim 15 wherein said at least one impermeable wall member is a plastic film wrap.

26. The apparatus of claim 15 wherein said bundle contains at least one additional impermeable wall member with one of the wall members surrounding said bundle except for a narrow flow transport region adjacent to one of said tubesheets.

27. A hollow fiber membrane gas separation apparatus comprising (i) a housing body defined by an essentially cylindrical bowl connected in a sealed and removable manner in correspondence with its axial end portion to a lid wherein said lid having formed therethrough a feed gas inlet port and a nonpermeate gas outlet product port, and wherein said bowl being provided with a permeate gas exit port placed coaxially to said housing body, and (ii) a concentric multiple zone hollow fiber membrane cartridge adapted for shell side feed placed coaxially in said housing body and connected in a sealed and removable manner with its first axial end to said feed gas inlet port or said nonpermeate outlet port in the lid and with its second axial end to said permeate gas exit port in the bowl, said cartridge includes:
   (a) an elongated tubular inner core member in communication with said feed gas inlet port or said nonpermeate gas outlet port,
   (b) a substantially cylindrical hollow fiber membrane bundle positioned coaxially to and at least partially surrounding said inner core member constructed from hollow fiber membranes having permeate and nonpermeate sides, said bundle being characterized as having a substantially countercurrent flow arrangement between the gas flow on said permeate side and the gas flow on said nonpermeate side,
   (c) first and second tubesheet encapsulating the opposite ends of said hollow fiber bundle in a fluid-tight arrangement with one end of the inner core member opening out of one of the tubesheets to permit the flow of gas in or out of said inner core member, said tubesheets are severed to permit unobstructed flow of gas in and out of the hollow fiber lumens,
   (d) at least one impermeable wall member extending longitudinally through said bundle and partitioning said bundle into at least a first and second section with the hollow fiber membranes partitioned between the sections, wherein said impermeable wall contains a passageway in close proximity to one of said tubesheets, and
   (e) first and second end closures attached to said tubesheets in a fluid-tight manner wherein said first closure is in fluid communication with said permeate gas exit port.

28. The apparatus of claim 27 wherein said second closure is equipped with a flow control orifice that allows a portion of the nonpermeate gas to be used as a sweep gas on the permeate side of said hollow fibers.

29. The apparatus of claim 28 wherein a gas flow transfer channel is further placed between said first and second section of the hollow fiber cartridge.

30. The apparatus of claim 28 which further comprises a shell surrounding said bundle.

31. The apparatus of claim 28 wherein said at least one impermeable wall member is a plastic film wrap.

32. The apparatus of claim 28 wherein said bundle contains at least two impermeable wall members with one wall member surrounding said bundle except for a narrow flow transport region adjacent to one of said tubesheets.

33. The apparatus of claim 27 wherein the hollow fiber membranes in said first and second sections exhibit different gas separation properties.

34. The apparatus of claim 27 wherein said cartridge contains at least one additional concentric section that contains hollow fiber membranes.

35. The apparatus of claim 34 wherein said cartridge contains two additional concentric sections that each contain hollow fiber membranes.

36. A hollow fiber membrane gas separation apparatus comprising (i) a housing body defined by an essentially cylindrical bowl connected in a sealed and removable manner in correspondence with its axial end portion to a lid, wherein said lid having formed therethrough a feed gas inlet port and an outlet non permeate gas port and wherein said bowl being provided with a permeate gas exit port placed coaxially to said housing body, and (ii) a substantially cylindrical hollow fiber membrane gas separation cartridge placed coaxially in said housing body and connected in a sealed and removable manner with its first axial end to said feed gas inlet port or said nonpermeate gas outlet port in said lid, and with its second axial end to said permeate gas exit port in the bowl, said cartridge includes:

(a) an elongated tubular inner core member in communication with said feed gas inlet port or said outlet nonpermeate gas port, (b) a substantially cylindrical hollow fiber membrane bundle positioned coaxially to and at least partially surrounding said inner core member constructed from hollow fiber membranes having permeate and nonpermeate sides, said bundle being characterized as having a substantially countercurrent flow arrangement between the gas flow on said permeate side and the gas flow on said nonpermeate side, (c) a first and second tubesheet encapsulating the opposite ends of said hollow fiber bundle in a fluid-tight arrangement with one end of the inner core member opening out of said second tubesheet to permit the flow of gas in or out of said inner core member and said first tubesheet severed to permit unobstructed flow of gas out of the hollow fiber lumens, (d) an end closure attached to said first tubesheet in a fluid-tight arrangement wherein said end closure is in fluid communication with said permeate gas exit port, and wherein said hollow fibers in said bundle are coated except for a narrow region adjacent to said second tubesheet, the uncoated region allowing a fraction of the nonpermeate gas to be used as a sweep on the permeate side of the hollow fiber membranes.

37. A hollow fiber membrane gas separation apparatus comprising (i) a housing body defined by an essentially cylindrical bowl connected in a sealed and removable manner in correspondence with its axial end portion to a lid, wherein said lid having formed therethrough a feed gas inlet port and an outlet nonpermeate gas port and wherein said bowl being provided with a permeate gas exit port placed coaxially to said housing body, and (ii) a substantially cylindrical hollow fiber membrane gas separation cartridge placed coaxially in said housing body and connected in a sealed and removable manner with its first axial end to said feed gas inlet port or said nonpermeate gas outlet port in said lid and with its second axial end to said permeate gas exit port in the bowl, said cartridge includes:

(a) an elongated tubular inner core member in communication with said feed gas inlet port or said outlet nonpermeate gas port, (b) a substantially cylindrical hollow fiber membrane bundle positioned coaxially to and at least partially surrounding said inner core member constructed from hollow fiber membranes having permeate and nonpermeate sides, said bundle being characterized as having a substantially countercurrent flow arrangement between the gas flow on said permeate side and the gas flow on said nonpermeate side, (c) a first and second tubesheet encapsulating the opposite ends of the hollow fiber bundle in a fluid-tight arrangement with one end of the inner core member opening out of one of the tubesheets to permit flow of gas in or out of said inner core member, said tubesheets are severed to permit unobstructed flow of gas in and out of the hollow fiber lumens, (d) first and second end closures attached to said tubesheets in a fluid-tight arrangement, wherein said first end closure is in fluid communication with said permeate gas exit port, and wherein the hollow fiber membranes in said bundle are coated between the tubesheets except for a narrow region adjacent to one of said tubesheets, which allows for introduction of a fraction of the nonpermeate gas as a sweep gas into the permeate side of the hollow fiber membranes.

* * * * *